(12) United States Patent
Brunnquell

(10) Patent No.: US 12,397,953 B2
(45) Date of Patent: Aug. 26, 2025

(54) LINE WITH FREELY PROGRAMMABLE TRAYS

(71) Applicant: GEA Food Solutions Germany GmbH, Biedenkopf-Wallau (DE)

(72) Inventor: Norbert Brunnquell, Altusried (DE)

(73) Assignee: GEA Food Solutions Germany GmbH, Biedenkopf-Wallau (DE)

( * ) Notice: Subject to any disclaimer, the term of this patent is extended or adjusted under 35 U.S.C. 154(b) by 0 days.

(21) Appl. No.: 18/279,419

(22) PCT Filed: Feb. 23, 2022

(86) PCT No.: PCT/EP2022/054473
§ 371 (c)(1),
(2) Date: Aug. 30, 2023

(87) PCT Pub. No.: WO2022/184517
PCT Pub. Date: Sep. 9, 2022

(65) Prior Publication Data
US 2024/0199257 A1    Jun. 20, 2024

(30) Foreign Application Priority Data

Mar. 3, 2021 (DE) .......................... 102021202059.3
Apr. 20, 2021 (DE) .......................... 102021203914.6

(51) Int. Cl.
*B65B 43/54* (2006.01)
*B26D 7/32* (2006.01)
*B65B 9/04* (2006.01)
*B65B 25/06* (2006.01)
*B65B 31/02* (2006.01)
*B65B 57/16* (2006.01)
*B65B 65/00* (2006.01)
(Continued)

(52) U.S. Cl.
CPC ................ *B65B 43/54* (2013.01); *B26D 7/32* (2013.01); *B65B 9/045* (2013.01); *B65B 25/065* (2013.01);
(Continued)

(58) Field of Classification Search
USPC ........................................... 53/435
See application file for complete search history.

(56) References Cited

U.S. PATENT DOCUMENTS

2017/0050332 A1*  2/2017  Bauer ................ A22C 17/0093
2018/0118388 A1*  5/2018  Grasselli ............... B65B 25/065
(Continued)

FOREIGN PATENT DOCUMENTS

DE    102014116232 A1    5/2016
DE    102016110039 A1    12/2017
(Continued)

OTHER PUBLICATIONS

International Search Report and Written Opinion dated Jul. 6, 2023, for International Application PCT/EP2022/054473.
(Continued)

*Primary Examiner* — Chinyere J Rushing-Tucker
(74) *Attorney, Agent, or Firm* — The Dobrusin Law Firm, P.C.

(57) ABSTRACT

A line having a food processing apparatus and a packaging machine between which a placement and transport apparatus is provided that has a plurality of tablet trays on which food products are placed and with which the food products are transported towards the packaging machine, the tablet trays move in a contact-free manner along a closed transport surface; a method for producing packaged food slices using the line, the food products are deposited onto the tablet trays and then transported towards the packaging machine; a method for cleaning the line, the tablet trays are lifted from the transport surface and the transport surface is cleaned with a cleaning liquid; and a method for cleaning the line, the tablet trays are removed from the transport surface and cleaned in a cleaning machine.

12 Claims, 1 Drawing Sheet

(51) Int. Cl.
*B65G 45/22* (2006.01)
*B65G 54/02* (2006.01)

(52) U.S. Cl.
CPC .......... *B65B 25/068* (2013.01); *B65B 31/028* (2013.01); *B65B 57/16* (2013.01); *B65B 65/003* (2013.01); *B65G 45/22* (2013.01); *B65G 54/02* (2013.01); *B26D 2210/02* (2013.01); *B65B 2210/06* (2013.01); *B65G 2203/0258* (2013.01); *B65G 2207/26* (2013.01)

(56) References Cited

U.S. PATENT DOCUMENTS

| | | | |
|---|---|---|---|
| 2019/0152724 | A1 | 5/2019 | Philipp et al. |
| 2020/0056928 | A1* | 2/2020 | Landrum ............ G01G 19/035 |

FOREIGN PATENT DOCUMENTS

| | | | |
|---|---|---|---|
| DE | 102016224951 | A1 | 6/2018 |
| EP | 3339221 | A2 | 6/2018 |
| EP | 3656709 | A1 | 5/2020 |
| WO | 2015/162182 | A1 | 10/2015 |
| WO | 2018/067567 | A1 | 4/2018 |
| WO | 2018/208658 | A1 | 11/2018 |
| WO | 2020/243814 | A1 | 12/2020 |

OTHER PUBLICATIONS

International Preliminary Report on Patentability dated Jun. 1, 2023, for International Application PCT/EP2022/054473.

* cited by examiner

LINE WITH FREELY PROGRAMMABLE TRAYS

CROSS-REFERENCE TO RELATED APPLICATIONS

This application is a US National Stage entry of PCT/EP2022/054473 filed on Feb. 23, 2022, which claims priority to DE 10 2021 202 059.3 filed Mar. 3, 2021 and to DE 10 2021 203 914.6 filed Apr. 20, 2021, all of which are hereby incorporated by reference herein for all purposes.

FIELD

The present invention relates to a line having a food processing apparatus and a packaging machine between which a placement and transport apparatus is provided.

BACKGROUND

The issue of hygiene and the compactness of the machines, preferably the shortest possible machine length and/or system length, is growing increasingly in importance in the field of food processing, for example when cutting food products into slices and packaging them.

SUMMARY

It was therefore the object of the present invention to provide a line and a method that satisfy these requirements.

The object is attained with a line having a food processing apparatus and a packaging machine between which a placement and transport apparatus is provided that has a plurality of tablet trays on which food products are placed and with which the placed food products are transported towards the packaging machine, the tablet trays moving in a contact-free manner along a closed transport surface.

The disclosure provided for this subject matter of the present invention applies equally for the other subject matters of the present invention and vice versa. Features that can be disclosed for this subject matter of the present invention can be included in other subject matters and vice versa.

The present invention relates to a line having a food processing apparatus and a packaging machine. The food processing apparatus can be a cutting apparatus or another type of portioning device.

A cutting apparatus cuts a food product, a so-called food bar, into a plurality of food slices. This food bar can be, for example, a block of wurst, cheese, or processed ham. A food bar in the context of the invention can also be a natural ham, however. This food bar is cut into food slices with a cutting apparatus. The food bar is transported continuously or intermittently towards a moving, preferably rotating, knife that cuts the food slices from the leading end of the food bar. The thickness of the slices is determined by the advancing path the food bar covers between two cuts.

A portioning devices divides a food mass, for example ground meat or meat substitute products, into a desired portion size.

The food product is inventively placed on a tablet tray that is disposed in a contact-free manner above a transport surface. The transport surface and the tablet trays are disposed upstream of the food processing apparatus. A plurality of tablet trays are each provided in a contact-free manner above the transport surface. The tablet trays are preferably produced from a magnetic material. The tablet trays preferably extend along a plane. The thickness of the tablet trays is preferably significantly less than their extension along the plane. Tablet trays of different sizes can be disposed on one transport surface simultaneously. The tablet trays are preferably coated, in particular entirely coated. This coating is preferably food safe, for example FDA-approved, and is provided such that the tablet trays can be cleaned in an industrial cleaning machine. For example, at least the surface on which the food product is disposed is made of metal, in particular steel or aluminum, preferably stainless steel. At least one surface of each tablet tray preferably has a non-skid coating such that the food product does not slip out of place during placement and/or transport. Alternatively or in addition, at least one surface of each tablet tray has a structure and/or a product stop means, for example an edge, that prevents the food product from slipping out of place during placement or transport.

At least one surface of each tablet tray can have a spacing means that spaces the food product, at least locally, from the surface of the tablet tray, so that it can be lifted from the tablet tray more easily, for example with grippers of a robot.

Alternatively or in addition, the placement surface of the tablet tray can be provided smaller than the placement surface of the product, so that the latter overhangs the tablet tray. This preferred embodiment of the present invention can also facilitate lifting of the product from the tablet tray.

The food products preferably fall onto the respective tablet tray. Preferably a plurality of food products fall onto one tablet tray and are thereby stacked and/or shingled. The tablet tray preferably moves while being loaded with the food product, in particular with the food products. For example, the distance between the surface of the transport surface and the tablet tray during loading can change, in particular can decrease. When in contact with the food product, the tablet tray can also execute a movement towards the transport surface in order to cushion the impact between food product and tablet tray. Alternatively or in addition, during placement of a plurality of food products, the tablet tray moves along a plane in one or two directions along a line or along a circle in order, for example, to shingle the food products.

Furthermore, according to the invention the line has a packaging machine. The packaging machine is preferably a so-called thermoformer or a so-called tray-sealer.

The packaging machine preferably works in a cyclical manner, wherein during one cycle a plurality of, for example, packaging trays, a so-called format, are produced, in particular by deep drawing a substrate film web, filled with food slices, and covered with a cover film, or are only filled and sealed with a cover film. In one cycle, a so-called format of packagings is produced that preferably comprises a plurality of lanes aligned parallel to the running direction of the substrate film web, and particularly preferably several gaps aligned perpendicular to the transport direction of the bottom film web. Alternatively a format can also have just one lane with one or a plurality of packagings, however.

According to one further preferred embodiment, the packaging machine is a so-called tray-sealer in which the pre-made individual packaging trays are filled with the food product and these packaging trays are then sealed with a cover film. The packaging trays are supplied to the packaging machine stacked, so that the tray-sealer as a rule has a so-called separating station in which the packaging trays are unstacked, i.e., separated. The food processing apparatus is preferably located upstream of a sealing station in which a cover film is sealed to the packaging tray.

In the tray-sealer, the distance between two packaging trays is preferably set to a desired amount upstream of the cutting apparatus. Alternatively or in addition, the packaging machine has means by means of which it is possible to determine where in the packaging machine the respective packaging tray is disposed so that the transport of the latter can be controlled or regulated such that for loading it is disposed in a desired position relative to the tablet tray holding the product with which it is to be filled.

Furthermore, the packaging machine is preferably a horizontal flow-wrapping machine. In this packaging machine, trays that are preferably molded, troughed, or flat, for example, are transported towards film packaging. Film packaging forms a tube that is sealed longitudinally from a planar web. The food portion and, where necessary, the tray are packed together in an enclosing film, the tube, with or without MAP (modified atmosphere packaging), and then sealed in that the tube is sealed transverse to its longitudinal extension. The sealing seam is generally on the bottom (film supplied from above) or on the side, but can also be on the top (film supplied from below). As a rule the portions are supplied to the flow-wrapping machine, with or without tray, in a single lane.

The food products are transported by means of the tablet trays to the packaging machine and there are placed in packaging trays. This can take place, for example, using the tablet tray itself or using a loader, for example a robot.

Alternatively, a packaging tray or a packaging surface is provided on the tablet tray. The food products can then fall or be placed directly into the packaging, for instance immediately after they have been cut or after they have been separated into portions from a plurality of products. This packaging tray or packaging surface is then sealed, in particular in an air-tight manner, in the packaging machine, for example using a so-called tray-sealer. The food products can also be stacked and/or shingled in the packaging tray or on the packaging surface. For this, the tablet tray preferably moves together with the packaging. One packaging can have a plurality of products adjacent to one another or a plurality of portions adjacent to one another that are added to the packaging simultaneously or sequentially.

The tablet tray, in particular its surface, has means that can prevent the packaging from slipping relative to the tablet tray. This means can be a non-skid surface or a stop means.

According to the invention, the food products are transported with the tablet trays from the food processing apparatus to the packaging machine. The tablet trays are moved in a contact-free manner along a closed transport surface. The tablet trays are suspended with a magnetic field and are transported further with a magnetic field in the sense of a linear motor. For this, a plurality of drive magnets that can be controlled in a freely programmable manner are disposed below the transport surface so that the tablet trays do not move along a path provided, for example, by rails, but rather the path is freely programmable.

Positional accuracy is preferably <1 mm, particularly preferred <0.5 mm, very particularly preferred <0.01 mm. The speed with which the tablet trays move along the closed surface is >100 mm/s, particularly preferably >500 mm/s, more particularly preferred >1000 mm/s, and most preferred >1800 mm/s. The maximum acceleration is preferably 5 m/s$^2$, particularly preferred >10 m/s$^2$, very particularly preferred >15 m/s$^2$. These accelerations are advantageous in particular when portions are being produced with a plurality of food slices at a cutting rate of more than 500 cuts per minute, preferably more than 700 cuts per minute, and very particularly preferred more than 1000 cuts per minute.

The load for a tablet tray is preferably at least 600 grams per tablet tray. If the cut portion does not weigh this much, more than one portion is preferably placed on the tablet tray.

The weight on the tablet tray is preferably detected continuously. The table tray is preferably used for checking weight while one or a plurality of portions are being cut. The signal for the measured weight of the portion on the tablet tray can be used for regulating the cutter in order to achieve the most accurate portions possible in terms of weight. The advance of the food bar between two cuts is regulated in particular with the signal from the tablet tray. The weight signal for the tablet tray can alternatively or additionally be used to regulate the path of the tablet tray. If the portion on the tablet tray following cutting is too light, the tablet tray is not sent to the packaging machine, for example, but instead to a weight correction station, and is moved to the packaging machine after the weight is corrected.

A tablet tray is preferably removed from the knife's drop region during so-called blank cuts, i.e. the knife rotates without slices being cut.

The drive magnets are preferably arranged in a prescribed grid. For this, a plurality of electromagnets that can be individually controlled are disposed beneath the transport surface. Each tablet tray is driven with these magnets like a linear motor. The transport surface is preferably impervious to cleaning agents so that it can be cleaned with a pressurized jet. The line is preferably cleaned in situ.

Each tablet tray preferably has a unique identifier and a computer system that controls the magnets knows where each tablet tray is on the transport surface at all times.

A plurality of tablet trays can preferably be combined into a group and particularly preferably be moved together. This group can be broken up temporarily and then recombined.

The distance between the tablet tray and the surface of the transport surface can be adjusted. This distance can preferably be changed when the food products are placed onto the tablet tray. The tablet tray is preferably lowered.

According to one preferred embodiment of the present invention, the tablet trays can be rotated or tilted about a vertical and/or at least one, preferably two, horizontal axes. This movement can be used, for example, to produce specific portion patterns or for dropping food products into a packaging. The tilt angle is preferably at least 10° relative to the horizontal, preferably >15° relative to the horizontal.

Further preferred, the tablet trays can be caused to vibrate in order to compact products or to change their position relative to the tablet tray.

Further preferred, the tablet tray has a movable surface. For example, the surface of the tablet tray can be embodied as a continuous belt.

The respective tablet tray can be embodied as a support for one or a plurality of packaging trays or packaging surfaces. In this preferred embodiment of the invention, the food product can be placed directly into the packaging tray or onto the packaging surface.

The object is also attained with a method for producing packaged food slices using the inventive line, wherein the food products are deposited, for example dropped, onto the tablet trays and then are transported towards the packaging machine.

The disclosure provided for this subject matter of the present invention applies equally for the other subject matters of the present invention and vice versa. Features that can be disclosed for this subject matter of the present invention are included in other subject matters and vice versa.

The food products can drop directly onto the tablet tray. However, a support, for example a packaging tray or packaging surface onto which the food product is deposited, may also be disposed on the tablet tray.

The food products are preferably arranged on the tablet trays in stacks and/or shingles.

According to one preferred embodiment, the tablet trays are moved, for example, lowered, rotated, and/or moved linearly, while the stacks or shingles are being formed.

If the food processing apparatus is a cutter, preferably a plurality of food products are cut simultaneously in a plurality of lanes. In this case, one tablet tray is arranged below each lane and/or one tablet tray that extends across a plurality of lanes is disposed below the lanes.

Preferably a plurality of food products are cut at least temporally simultaneously, preferably independently of one another. For this, the inventive cutting apparatus preferably has a plurality of so-called advance lines along each of which one food product is transported. A plurality of food slices are cut essentially simultaneously during one cyclical movement of the cutting knife, for example one rotation.

In one preferred embodiment of the present invention, different food products are cut. It is very particularly preferred that each portion has food slices from different food products. This can be attained, for example, in that while one portion is being cut, a tablet tray is moved such that the respective portion to be produced is arranged in alternating trajectories of the food slices of the respective food.

According to one preferred embodiment of the present invention, the food slice stacks or shingles are placed directly into the packaging from the tablet tray. For placement, the tablet tray can execute a rapid backward, lowering, and/or tilting movement. Further preferred, the transport surface in this embodiment can extend into the region of the packaging machine and thus deposit the tablet trays over the respective packagings and then to place the food products into the packagings.

Once the food products have been added to the packagings, the empty tablet trays are transported along the transport surface towards the cutting apparatus. Each tablet tray preferably moves along a closed path, for example a circular path, an ellipse, or a rectangle, wherein this path is not formed by rails or the like, but rather is controlled in a freely programmable manner using magnetic fields.

The path of a tablet tray can preferably be changed at any time in order, for example, to prevent two tablet trays from colliding. A plurality of tablet trays can be combined into a group and moved together. This group can be broken up, for example for return transport, and then reconfigured for loading the tablet trays.

As a rule, a plurality of food slices are combined to make a portion. This portion is preferably configured directly on the respective tablet tray.

According to one preferred embodiment, a first cut slice and/or an end piece is collected with one tablet tray and then transported away.

According to one preferred embodiment, the food product is weighed on the respective tablet tray. The food products placed onto the respective tablet tray are weighed there. In this way it can be assured on site that the respective portion is of the required TARGET weight. If the ACTUAL weight is too low, one or more food products are added. If the ACTUAL weight is too high, the tablet tray can be transported to a certain position in which the weight is corrected.

One further subject matter of the present invention is a method for cleaning the inventive line in which the tablet trays are raised from the transport surface and the transport surface is cleaned with a cleaning liquid.

The disclosure provided for this subject matter of the present invention applies equally for the other subject matters of the present invention and vice versa. Features that can be disclosed for this subject matter of the present invention can be included in other subject matters and vice versa.

One further subject matter of the present invention is a method for cleaning the inventive line in which the tablet trays are removed from the transport surface and cleaned in a cleaning machine.

The disclosure provided for this subject matter of the present invention applies equally for the other subject matters of the present invention and vice versa. Features that can be disclosed for this subject matter of the present invention can be included in other subject matters and vice versa.

BRIEF DESCRIPTION OF THE DRAWINGS

The invention is explained in the following using FIGS. 1-2. These explanations are merely by way of example and do not limit the general inventive idea. The explanations apply equally for all subject matters of the present invention.

DETAILED DESCRIPTION

Figure 1:
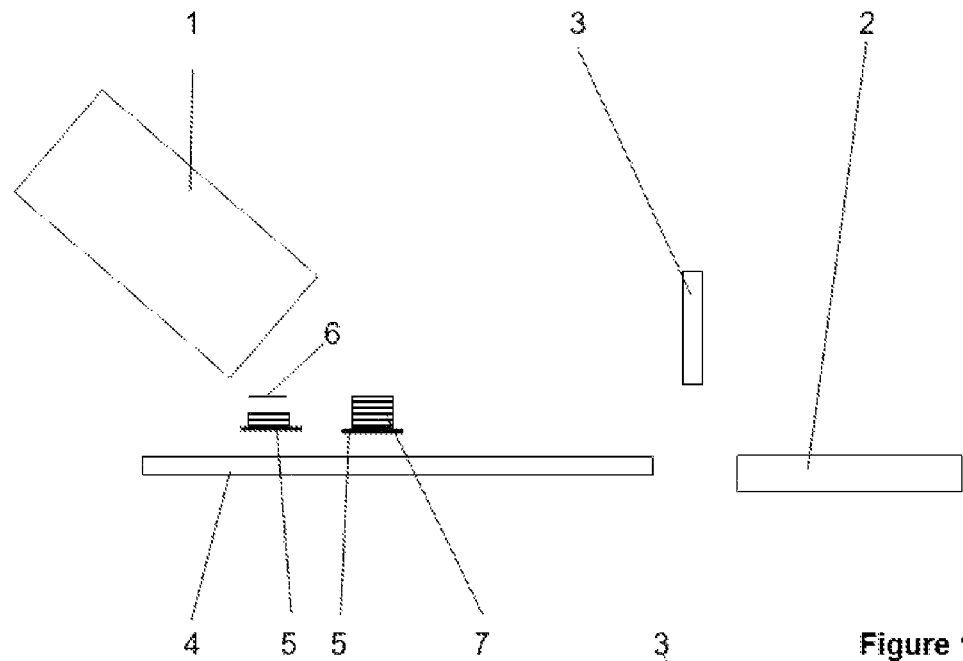
FIG. 1 illustrates a first embodiment of the present invention.

FIGS. 1 und 2 illustrate one embodiment of the inventive line that has a food processing apparatus 1, in the present case a cutting apparatus, and a packaging machine 2, for example a tray-sealer. Provided therebetween is a placement and transport apparatus 10 that transports food products from the food processing apparatus 1 to the packaging machine. The packaging machine 2 is preferably embodied as a tray-sealer or thermoformer. The placement and transport apparatus 10 has a completely closed transport surface, for example a stainless steel surface, along which tablet trays 5 move in a contact-free manner along a freely programmable lane. The tablets are suspended and also moved by means of a magnetic field. The food product 6 is deposited onto the tablet trays and preferably arranged in a portion 7, in this case a stack. As soon as the food product has been placed or the portion is configured, the tablet tray 5 is transported towards the packaging machine 2. A loader, for example a robot, can remove the products or portions 7 from the tablet tray and place them in a packaging 8, which is then sealed with a cover film. The packagings are preferably arranged in a format, in this case 3×3, that is jointly filled and sealed with the cover film at the same time. Alternatively, a packaging tray or packaging surface onto which the product 6 or the portion 7 is deposited can also be arranged on the tablet tray. This filled packaging tray/packaging surface is then sealed with a cover film in the packaging machine.

Figure 2:
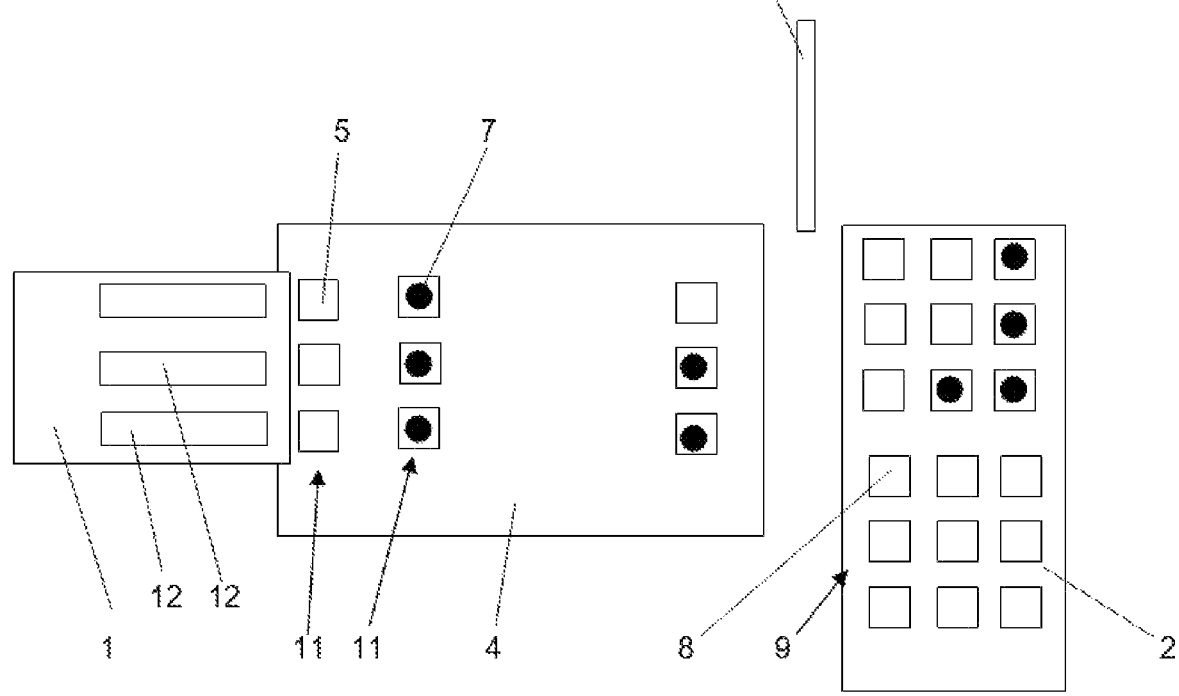
FIG. 2 illustrates the inventive apparatus with a particle catcher.

As may be seen in particular in FIG. 2, in the present case the food processing apparatus has a plurality of lanes, in this case three lanes, that produce food products 6, in this case food slices 6, simultaneously in that they cut these slices from a food product. Consequently, a plurality of tablet trays, in this case three tablet trays, are provided as a group 11 that receive the food products 6 and then transport them together towards the packaging machine. This group can be broken up on the return path and then re-formed in the region of the food processing apparatus.

REFERENCE LIST

1 Food processing apparatus
2 Packaging machine

3 Loader
4 Transport surface
5 Tablet tray
6 Food product, food slices
7 Portion, product stack, stack of food slices
8 Packaging
9 Format
10 Placement and transport apparatus
11 Group of tablet trays
12 Food product

The invention claimed is:

1. A method for producing packaged food slices using a line having a food processing apparatus and a packaging machine, between which a placement and transport apparatus is provided that has a plurality of tablet trays on which food products are placed and with which the food products are transported towards the packaging machine, the tablet trays move in a contact-free manner along a closed transport surface, wherein the tablet trays have a movable surface comprising a continuous belt on which the food products are placed, wherein the food products are deposited onto the tablet trays and then transported towards the packaging machine to be sealed, wherein a weight of the tablet trays is measured while the food products are cut from a food bar by a cutter of the food processing apparatus, and a signal of the measured weight of the food products is used for regulating the cutter of the food processing apparatus, and an advance of the food bar between two cuts is regulated by the signal, wherein if the weight of a tablet tray is below a target weight, then the tablet tray is sent to a weight correcting station to correct the weight and then the tablet tray is moved to the packaging machine after the weight is corrected, and wherein the tablet trays are vibrated to compact the food products or change their position on the tablet tray.

2. The method according to claim 1, wherein a path that the tablet trays are transported along the closed transport surface is freely programmable.

3. The method according to claim 1, wherein a distance between the tablet trays and a surface of the closed transport surface can be adjusted.

4. The method according to claim 1, wherein the tablet trays can be grouped together as a group or as a temporary group.

5. The method according to claim 1, wherein the tablet trays are rotatable about a vertical and/or at least one or two horizontal lines.

6. The method according to claim 1, wherein the food products are arranged on the tablet trays in stacks and/or shingles.

7. The method according to claim 6, wherein the tablet trays are moved while the stacks and/or the shingles are being formed.

8. The method according to claim 1, wherein a plurality of food products are cut simultaneously in a plurality of lanes, wherein a tablet tray is arranged beneath each of the plurality of lanes and/or a tablet tray extends across the plurality of lanes.

9. The method according to claim 1, wherein empty tablet trays are transported along the closed transport surface towards the cutter.

10. The method according to claim 1, wherein the tablet trays are lifted from the closed transport surface and the closed transport surface is cleaned with a cleaning liquid.

11. The method according to claim 1, wherein the tablet trays are removed from the closed transport surface and cleaned in a cleaning machine.

12. The method according to claim 1, wherein the tablet trays are tilted about a vertical axis relative to a horizontal plane, wherein a tilt angle relative to the horizontal plane is at least 10 degrees, and wherein a packaging tray is provided on each of the tablet trays on which the food products are placed, the packaging tray is then sealed in the packaging machine.

* * * * *